Aug. 28, 1951  L. E. DOUGHERTY  2,565,551
TORQUE CONVERTER

Filed July 8, 1949  3 Sheets-Sheet 1

INVENTOR.
LEMUEL E. DOUGHERTY
BY
Ralph B. Stewart
ATTORNEY

Aug. 28, 1951  L. E. DOUGHERTY  2,565,551
TORQUE CONVERTER

Filed July 8, 1949  3 Sheets-Sheet 2

INVENTOR.
LEMUEL E. DOUGHERTY
BY
Ralph B. Stewart
ATTORNEY

Aug. 28, 1951 — L. E. DOUGHERTY — 2,565,551
TORQUE CONVERTER
Filed July 8, 1949 — 3 Sheets-Sheet 3

INVENTOR.
LEMUEL E. DOUGHERTY
BY
Ralph B. Stewart
ATTORNEY

Patented Aug. 28, 1951

2,565,551

UNITED STATES PATENT OFFICE 2,565,551

TORQUE CONVERTER

Lemuel E. Dougherty, Washington, D. C.

Application July 8, 1949, Serial No. 103,680

21 Claims. (Cl. 74—687)

This invention relates to torque converters and in particular to a torque converter capable of providing stepless variation in speed ratios between a driving shaft and a driven shaft.

A primary object of the invention is to provide a torque converter having a relatively high efficiency over a wide ratio of speeds between the driving and the driven elements.

Another object of the invention is to provide a torque converter utilizing a fluid transmission medium wherein the centrifugal force imparted to the fluid medium by the driving element is utilized directly as pressure energy against the blades or vanes of a rotatable driven element, rather than the imparting of kinetic energy to the fluid and then the utilization of this kinetic energy to drive a turbine.

Still another object is to provide a torque converter in which the torque and speed characteristics may be controlled by varying the flow of fluid in the converter.

The invention involves a rotor having mounted thereon a series of bladed wheels that are rotatable about axes radially displaced from the axis of the rotor. These bladed wheels are mounted in circular cavities in the rotor so that in effect a series of pockets or buckets are formed by the blades of the wheel and the walls of the cavities, as in a conventional gear pump. A fluid transmission medium is fed to these pockets or buckets at some point near the center of the rotor and openings are provided in the cavity walls at some point farther out from the center of the rotor to allow the fluid medium to be discharged from the buckets; preferably these discharge openings are provided at points nearest the periphery of the rotor. Means are provided to collect the discharged fluid and return it to the inlet point near the center of the rotor. Suitable means, such as gearing, are provided to connect the bucket wheels in driving relation to an output shaft. When the rotor is rotated the fluid medium in the buckets between the inlet and the discharge openings exerts a centrifugal force proportional to the square of its velocity; a component of this centrifugal force is transmitted to the bucket wheels, and since the fluid is only present in buckets along a portion of the periphery of the wheels, an unbalanced force is created tending to rotate the wheels which, in turn, transmit torque to the output shaft.

A preferred form of the invention with certain modifications are shown in the accompanying drawings in which.

Figure 1:
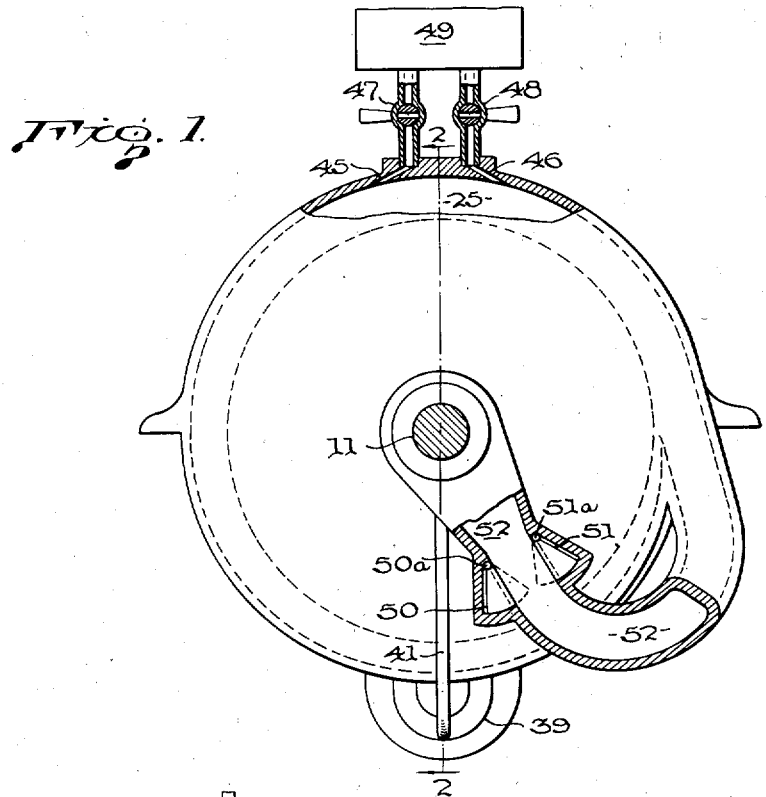
Figure 1 is an end view of the converter with the casing shown partly in section to illustrate the fluid passages and the control valves.
Figure 2:
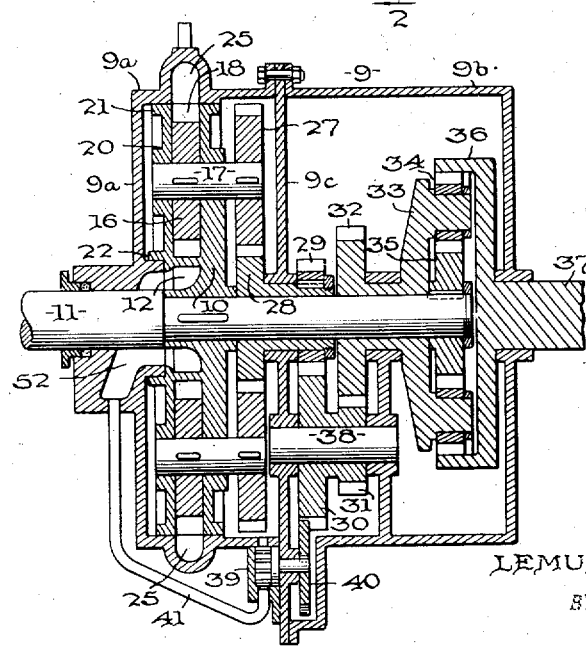
Figure 2 is a sectional view along the line 2—2 of Figure 1.

Referring to Figures 1 and 2, the converter involves a casing 9 enclosing a rotor 10 which is mounted on and rotates with input or driving shaft 11. For convenience of construction the casing 9 may be formed in two parts 9a and 9b bolted together with a partition plate 9c interposed between them. The bucket wheels 16 are carried by rotor 10 and are connected by a suitable gear train to the output shaft 37. The casing 9 has a volute passage 25 formed therein which collects the fluid as it is discharged from the rotor and a passage 52 which returns the collected fluid to the inlet of the rotor.

Figure 3:
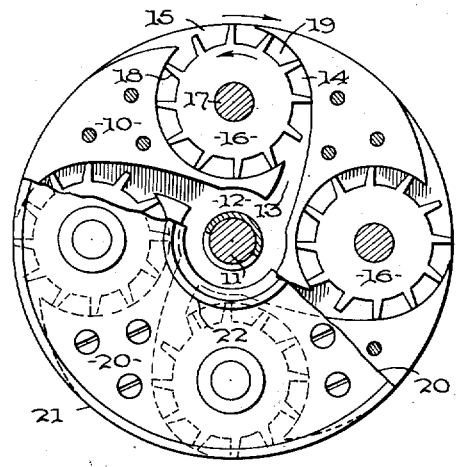
Figure 3 is an end view of the main rotor assembly.

Referring to Figure 3, the rotor 10 is provided with an annular fluid passage 12 surrounding shaft 11 which serves as an inlet for the fluid medium. A plurality of circular cavities 14, adapted to receive bucket wheels 16, are formed in the rotor 10 and are connected to the annular passage 12 by tangentially arranged passages 13. The outlet ports 15 allow fluid to discharge from the cavities 14 at the periphery of the rotor 10. The bucket wheels 16 are rotatably mounted in the cavities 14 by means of shafts 17 which are journalled in rotor 10, and gears 27 are mounted on the opposite ends of shafts 17. Bucket wheels 16 and gears 27 are keyed to shafts 17 and gears 27 mesh with a common gear 28, which is rotatably mounted on shaft 11. Gear 28 is connected to the output or driven shaft 37 through suitable gearing to be described later. An annular cover plate 20 is secured to the recessed face of rotor 10 and forms the opposite side walls of wheel cavities 14. Cover plate 20 is provided with a cylindrical fluid-sealing flange 21 at its outer drical surface of casing 9, and a second cylindrical fluid-sealing flange 22 is provided around the central opening in plate 20 which cooperates with a cylindrical boss projecting inwardly from the end wall of casing section 9a. The blades 18 of the bucket wheels 16, acting in conjunction with the walls of the cavities 14 form pockets or buckets 19 for carrying the fluid medium. The fluid expelled from ports 15 is collected by the volute passage 25 formed in casing part 9a around the rotor and is returned to the eye 12 of the rotor through the conduit or passage 52.

Briefly the operation of the device is as follows:

Consider the inlet 12, passages 13 and buckets 19 up to the outlet port 15 to be filled with fluid. If the rotor 10 is rotated clockwise, the fluid in each bucket will travel in a circular path around the center of shaft 11 and will exert centrifugal force radially away from that center. If the shafts 17 are held and do not rotate relative to the rotor 10, with gear 28 rotating at the same speed and in the same direction as shaft 11, the centrifugal force of the fluid in each bucket may be resolved into two components, one of which will act tangently to the bucket wheels 16, or perpendicular to the face of the blades 18. This component of the centrifugal force acting through the blades 18 imparts a static torque to the shafts 17. It should be noted that in this condition no flow of fluid is taking place and the only power required to develop a high static torque is that required to overcome normal friction and rotate the rotor 10 at a high speed.

When the rotor 10 is rotating at a sufficiently high speed so that the torque imparted to shafts 17 overcomes the resistance of the driven machine and the bucket wheels 16 begin to rotate in counterclockwise direction relative to rotor 10, fluid enters the inlet 12, flows through the passages 13, enters the buckets 19 and is moved by centrifugal force to the outlet ports 15 where it leaves the rotor with a backward velocity, relative to the rotor. However, this backward velocity relative to the rotor is less than the forward velocity of the rotor rim and the absolute velocity of the discharged fluid is forward in the direction of rotor rotation. The absolute velocity of the discharged fluid then varies inversely with the speed of the bucket wheels 16 relative to the rotor 10. With a constant speed of the rotor an increase in speed of the bucket wheels increases the fluid flow through the rotor but decreases its absolute velocity at discharge from the rotor.

Figure 4:
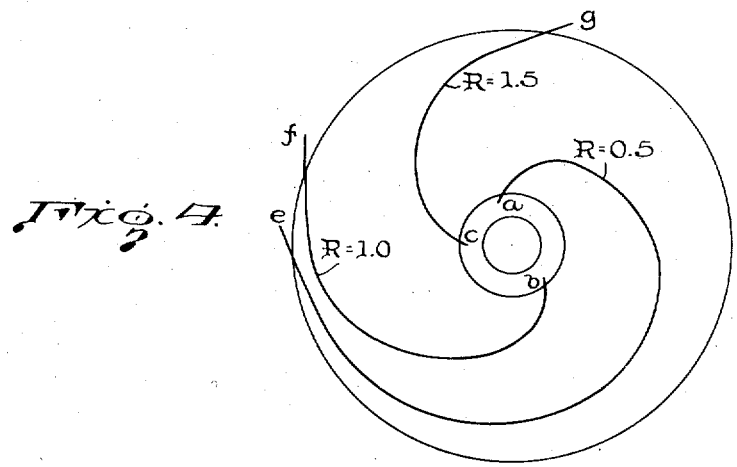
Figure 4 is a diagram showing the fluid path at different speeds of the driven element.

The absolute path of a mid-stream particle of fluid as it passes through the rotor at various speeds of the bucket wheels is illustrated in Figure 4. The path of the fluid has been plotted for three ratios (designated as R) of the bucket wheel speed divided by the rotor speed. The curves a—e, b—f, and c—g represent the absolute path of the fluid particle at values of R of 0.5, 1.0, and 1.5, respectively. When there is no rotation of the bucket wheels the path of each particle of fluid in the buckets describes a concentric circle about the center of the rotor because there is no outward movement of the fluid. When the bucket wheels rotate, the radial component of velocity added to the tangential component imparted by the rotation of the rotor causes the fluid to follow a curved path from the eye of the rotor to the rim.

Figure 5:
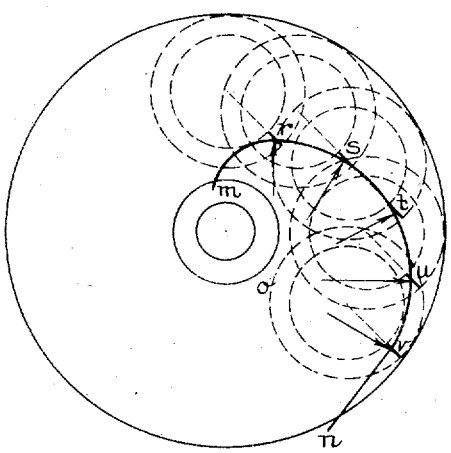
Figure 5 is a diagram showing the fluid path in relation to the blades of the driven element.

The centrifugal force exerted by the fluid at any point along the absolute paths illustrated in Figure 4 will be determined by the velocity of the fluid and the radius of curvature at that point. This is illustrated in Figure 5, where the line m—n is the path of the fluid when R=1.0. The centers of curvature are generally designated by o and the lines o—r, o—s, o—t, o—u, and o—v show the direction of the centrifugal force at various points and its relation to the blades of the bucket wheel.

The details of the preferred form of gear train connecting gear 28 with the output shaft 37 are shown in Figure 2. Gear 29 is rigidly connected to gear 28 and drives gear 32 through intermediate gears 30 and 31 mounted on countershaft 38. Gear 29 meshes with gear 30, gear 31 is attached to gear 30 and meshes with gear 32, which may be integral with and drives the planet pinion carrier 33 on which the planet pinions 34 are rotatably mounted. These planet pinions engage the internally toothed ring gear 36 and the sun gear 35 which is mounted on the end of shaft 11. Ring gear 36 is attached to shaft 37, which is the driven or output shaft.

The preferred ratio of gears 27 to 28 is 1:1 and the speed ratio of gear 29 to gear 32 through gears 30 and 31 is 3:1. Thus the planet pinion carrier 33 is driven in the same direction as, and at ⅓ the speed of, gear 28. The diametrical ratio of ring gear 36 to gear 35 is 2:1. If the output shaft 37 is held stationary by the load, the gear 35 rotates with input shaft 11, the planet pinion carrier 33 and attached gear 32 will rotate in the same direction as, and at ⅓ the speed of, shaft 11. Gear 28 will then rotate in the same direction and at 3 times the speed of gear 32 or the same speed and direction as shaft 11 and rotor 10. There will then be no relative rotation between gears 28 and 27 and no rotation of the bucket wheels 16 relative to rotor 10, so there will be no drive through the device and no flow of fluid through the rotor although a high static torque will be imparted to output shaft 37. As this static torque is due entirely to centrifugal force of the fluid trapped in the buckets, it will vary as the square of the rotor speed.

When the torque generated becomes large enough to move the load (by increasing the speed of rotor 10), and shaft 37 begins to turn, the bucket wheels will then be turning counter-clockwise in relation to rotor 10. When the ratio of bucket wheel speed to rotor speed is 1:1, gear 28 will be turning at twice the speed of shaft 11 which will cause pinion carrier 33 to rotate at ⅔ the speed of gear 35. Ring gear 36 and output shaft 37 will then be driven at ½ the speed of input shaft 11. The arrangement of differential gearing illustrated in Figure 2 provides a variable speed to the output shaft from a ratio of 0 when there is no rotation of the bucket wheels to a ratio of 2:1 when the bucket wheels are making one revolution counter-clockwise relative to the rotor for each revolution clockwise of the rotor.

The ratios in the gear train described above are merely illustrative and may be varied to meet individual requirements. In some installations it will be desirable to provide a different ratio in the gearing, to allow the bucket wheels 16 to revolve slowly in relation to the rotor 10 at zero speed of the output shaft 37. This slow rotation of the bucket wheels when the output shaft is stationary assures that all the buckets between the inlet and discharge openings are evenly filled with fluid and that the buckets on the other side of the wheels are empty of fluid, thus preventing any imbalance of the rotor assembly and assuring a maximum torque output.

One of the basic characteristics of this device is that the more torque required by the output shaft the less torque, but at a higher speed, is required from the input shaft. Thus when the device is coupled to a flexible source of power, such as an internal combustion engine, no governing or control apparatus may be required. To develop a high load starting torque the engine may be operated at high speed and low torque output. As the load gains speed and the torque requirement is less, the engine will then operate at a lower speed and higher torque output. If this device is to be used as a variable speed drive coupled to a constant speed power source and where the torque required may not be the governing factor, control means may be provided. Control of the output speed may be achieved by varying the flow of fluid into the inlet of the rotor either by a variable restriction in the fluid circuit or by varying the volume of fluid in the circuit.

Methods of varying the quantity of fluid in the circuit and of restricting the flow are illustrated in Figure 1. A fluid reservoir 49 is connected by the valves 47 and 48 and the passages 45 and 46 to the top of the volute passages 25 in the casing 9. Passages 45 and 46 are disposed nearly tangent to the curve of the volute. It is apparent that if valve 47 is opened the rotating fluid in the volute passage 25 will enter passage 45 and thence to the reservoir, reducing the quantity of fluid in the circuit. Conversely, if valve 48 is opened the fluid will flow from the reservoir through passage 46 into the volute 25 by injector action until the passages of the fluid circuit are filled to a certain extent. It will be understood of course that the system is never completely filled with fluid since the buckets on the return side of wheels 16 must be empty or have less fluid in them than on the side of the wheel where the buckets form part of the passage 13. As the torque output is dependent on the quantity of fluid in each bucket, at a given rotor speed and bucket wheel speed, a reduction in the quantity of the fluid in the circuit will result in a reduction of torque output.

Still referring to Figure 1, the fluid passage 52 leading from the volute to the inlet of the rotor is equipped with a throttle valve consisting of co-acting halves 50 and 51. This throttle valve is shown in the open position in solid lines and in the closed position by dotted lines. The two valve parts are of circular segment form and normally are positioned within pockets formed in opposite walls of conduit 52. They are mounted for swinging movement about axes 50a and 51a so as to restrict the passage 52 to a variable extent. At a given speed of the rotor the closing of the throttle valves 50 and 51 restricts the flow of fluid into the eye of the rotor and thence into the buckets. It is apparent that when operating under a given torque requirement that a certain quantity of fluid must be contained in each bucket wheel to provide the torque required, and when the flow of fluid to the bucket wheels is reduced it will result in a reduction of their speed.

Figure 6:
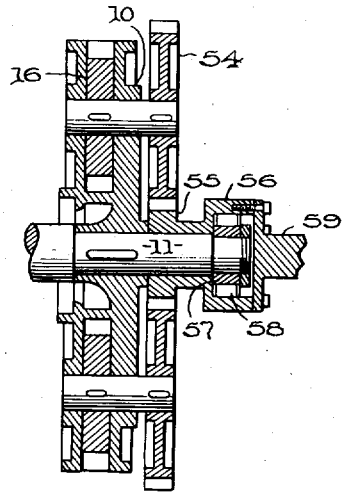
Figure 6 is a vertical sectional view of the main rotor assembly with gearing, which provides an output speed higher than the input speed.

In Figure 6 is illustrated a modified form of gearing when it is desired to drive the output shaft at a higher speed than the input shaft. Gears 54 driven by the bucket wheels 16 mesh with gear 55 which may be smaller in diameter. Attached to gear 55 is a one-way roller clutch comprised of the outer body 56, the rollers 58 and the inner body 57, which is attached to the input shaft 11. The output shaft 59 is attached to the outer body 56 of the one-way clutch and is thus driven by gear 55. The one-way clutch prevents gear 55 from rotating backwardly in relation to shaft 11 and rotor 10, thus providing a minimum ratio of 1:1 between the input and output shafts. Rotation of the bucket wheels 16 causes gear 55 and output shaft 59 to be driven at higher speed than the input shaft.

For maximum efficiency of the device it is necessary to utilize the energy of the fluid discharged from the rotor. As illustrated in Figures 1 and 2, this discharged fluid may be collected in a volute passage and then led back to the eye of the rotor. The energy of this fluid is then utilized by acting through the passages 13 (Figure 3) to drive the rotor and also by impact against the blades of the bucket wheels. To afford maximum utilization of the energy of the fluid under certain conditions of operation additional mechanisms may be provided.

Figure 7:
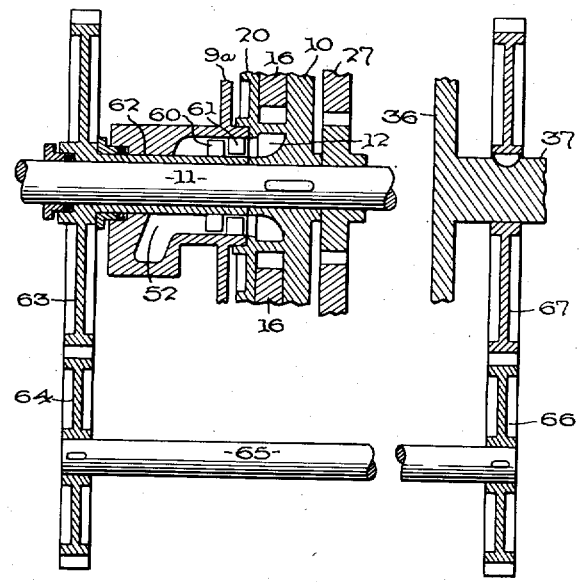
Figure 7 is a partial sectional view of a modified form of the device incorporating an axial flow turbine.

In Figure 7 is illustrated a modified form of the device incorporating an axial flow turbine in the fluid passage forward of the inlet of the rotor. The hollow shaft 62 is mounted over the input shaft 11 and extends through the housing 9 and is provided with suitable fluid sealing means. Turbine blades 60 are attached to shaft 62 so that the fluid flow from conduit 52 to eye 12 tends to rotate shaft 62 in the same direction as shaft 11. The reaction blades 61 are fixedly mounted in the casing and serve to straighten the fluid flow before it enters the eye 12 of the rotor 10. Shaft 62 is connected in driving relation with output shaft 37 by means of gears 63, 64, shaft 65, gear 66 and gear 67. Energy obtained from the fluid flow by the turbine blades 60 is then applied as additional power to the output shaft. It may be noted that there is a direct relationship between the flow of fluid in the fluid circuit and speed of the output shaft; thus it is possible to design the turbine blades for a fairly high efficiency over a wide range of operating conditions. In Figure 7, the arrangement for connecting the bucket wheels 16 with output shaft 37 is the same as in Figure 2 but is shown in fragmentary form.

Figure 8:
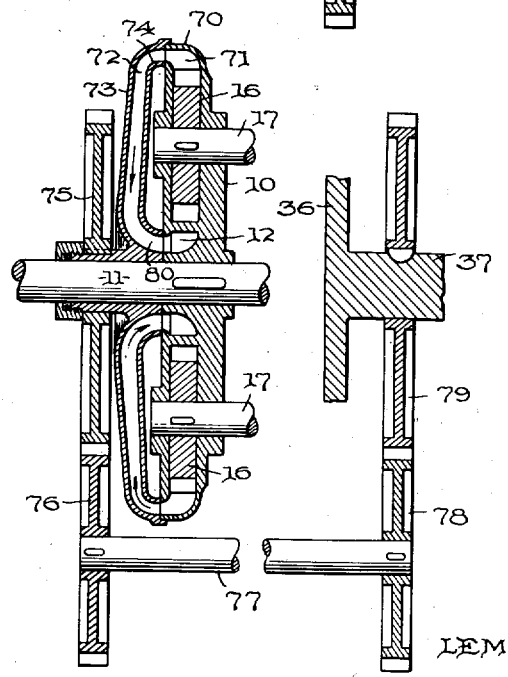
Figure 8 is a partial sectional view of another modified form of the device incorporating a radial inward flow turbine.

In Figure 8 is illustrated another means for utilizing the energy of the fluid circuit. The rotor assembly 10 shown in fragmentary form is similar to that already described for Figures 1 and 2 with the exception of incorporating curved fluid passages 71 at the outer rim to discharge the fluid in an axial rather than a radial direction. A radial inward flow turbine comprised of the inner shell 74, the outer shell 73 and the vanes 72 is co-axially mounted in relation to the rotor so that fluid discharged through passages 71 enters the fluid passages 80 of the turbine and flows inwardly to the eye 12 of the rotor. The actual flow of fluid through this circuit will be in the form of a torus as in fluid couplings of the Föttinger type. The outer shell 73 of the turbine is carried by a hollow shaft journalled on shaft 11 and the hollow shaft carries a gear 75 which is connected in driving relation to output shaft 37 by means of gear 76, shaft 77, gear 78 and gear 79. As the speed of the output shaft increases the speed of the turbine also increases, which, through centrifugal force, increases the fluid pressure against which fluid must be discharged from the rotor. This alters the basic characteristics of the device to some extent in that increased pressure of the fluid discharge reduces the torque output of the bucket wheels, but additional torque on the output shaft is supplied by the turbine.

Suitable fluid sealing means are employed in all modifications to prevent the leakage of fluid from the inlet of the rotor along the input shaft. In addition, as shown in Figure 2, a small scavenging pump 39, driven by gear 40 which meshes with gear 30, pumps the fluid that collects in the bottom of casing section 9a (due to leakage about the periphery of rotor 10) back to the eye of the rotor through line 41.

While I have shown and described a preferred form of my invention and certain modifications thereof, my invention is not limited to the specific forms described but may be embodied in other forms coming within the scope of the appended claims.

Throughout the description and in the appended claims I have used the term "fluid" to describe the working medium, which may be a liquid, such as oil, but it should be understood that any other form of flowable substance possessing the necessary flow characteristics can be used as a working medium and that this invention encompasses the use of such substances.

What I claim is:

1. In a fluid torque converter, the combination of an input shaft, an output shaft, a rotor driven by said input shaft, said rotor having formed therein an inlet, at the center thereof, a plurality of circular cavities spaced radially from said inlet, a plurality of passages connecting said inlet and said cavities, and a plurality of outlet ports for said cavities formed in a peripheral portion of said rotor, a plurality of bucket wheels rotatably mounted in said cavities and being driven by the centrifugal force of the fluid in the buckets of said wheels, means connecting said bucket wheels in driving relation with said output shaft, a casing surrounding said rotor to receive fluid from said ports, and means to return the fluid collected by said casing to the inlet of said rotor.

2. A fluid torque converter according to claim 1 and including means to control the flow of the fluid through said rotor comprising a fluid reservoir with an inlet and an outlet passage connecting said reservoir with said casing, and valves in said inlet and outlet passages to control the transfer of fluid between said reservoir and said casing.

3. A fluid torque converter according to claim 1 wherein said means to return the fluid to the inlet of said rotor comprises a stationary passage having included therein means to vary the effective cross-sectional area thereof.

4. A fluid torque converter comprising an input shaft, an output shaft, a rotor driven by said input shaft, a bucket wheel carried by said rotor and mounted for rotation on an axis radially displaced from the axis of said rotor, means connecting said bucket wheel in driving relation with said output shaft, and means to receive fluid as it leaves said bucket wheel and return it to said bucket wheel at a point nearer the axis of said rotor, whereby said bucket wheel is driven by the centrifugal force of the fluid in the buckets of said wheel.

5. A fluid torque converter comprising a rotor, a bucket wheel mounted on said rotor, means directing fluid into the buckets of said wheel at one point and discharging the fluid from said buckets at a second point located at a greater radial distance from the axis of said rotor than said one point, whereby said wheel is driven by the centrifugal force of the fluid in the buckets of said wheel, an output shaft, means connecting said bucket wheel in driving relation to said output shaft, and means adjacent said rotor to receive the fluid as it leaves said rotor and return it to the inlet of said rotor.

6. A fluid torque converter according to claim 5 wherein said means connecting said bucket wheels with said output shaft comprises a planetary gear train.

7. A fluid torque converter according to claim 6 wherein the connection between said bucket wheels and said planetary gear train includes gearing to maintain said bucket wheels substantially stationary with respect to said rotor when said output shaft is stationary.

8. A fluid torque converter according to claim 5, in which said means for receiving the fluid and returning it to the inlet of said rotor includes an axial flow turbine, and means supplying energy from said turbine to said output shaft.

9. A fluid torque converter according to claim 5 wherein said means for receiving fluid as it leaves said rotor and returning it to the inlet of said rotor comprises a radial inward flow turbine, and means supplying energy from said turbine to said output shaft.

10. A fluid torque converter according to claim 5 and including means to vary the rate of flow of fluid through said rotor.

11. In a fluid torque converter, a rotor having formed therein an inlet in the central portion thereof, a bucket wheel carried by said rotor and mounted for rotation about an axis radially disposed from the axis of said rotor, means for directing fluid from said inlet to the buckets of said wheel, and means to allow the fluid to leave the buckets of said wheel at a point at a greater radial distance from the axis of said rotor than the point at which the fluid entered said buckets, whereby said wheel is driven by centrifugal force of the fluid in the buckets thereof.

12. In a fluid torque converter, the combination of a rotor and a plurality of bucket wheels, said rotor having formed therein an inlet at the center thereof, a plurality of circular cavities radially displaced from said inlet, a plurality of passages connecting said inlet with said cavities, and a plurality of outlet ports for said cavities formed in a peripheral portion of said rotor, said bucket wheels being rotatably mounted in said cavities and being driven by the centrifugal force of the fluid in the buckets of said wheels.

13. A fluid torque converter according to claim 10 wherein said means connecting said bucket wheel with said output shaft comprises a gear rotatably mounted coaxially with said rotor and connected to said output shaft, a second gear attached to said bucket wheel, said output shaft gear meshing with said bucket wheel gear, and a one-way clutch connecting said rotor with said output shaft and permitting said output shaft to rotate faster than said rotor.

14. A fluid torque converter comprising a casing having a volute passage therein, a conduit connecting the outlet of said volute passage to the center of said casing, an input shaft journaled within said casing at the center thereof and extending through one side thereof, an output shaft journaled within said casing in alignment with said input shaft and extending through the other side of said casing, a rotor mounted within said casing and rigidly attached to said input shaft, said rotor having formed therein an inlet in the central portion thereof, a plurality of circular cavities, a plurality of passages connecting said inlet with said cavities in tangential relation, and a plurality of ports in a peripheral portion of said rotor connecting said cavities with said volute passage, a plurality of bucket wheels rotatably mounted within said cavities and driven by the centrifugal force of the fluid in the buckets of said wheels, and means connecting said bucket wheels in driving relation with said output shaft.

15. A torque converter comprising an input shaft, an output shaft, a rotor driven by said input shaft, a plurality of bucket wheels carried by said rotor and mounted for rotation on axes radially displaced from the axis of said rotor, means comprising passages in said rotor adapted to carry fluid to one side of said bucket wheels from a centrally located inlet, and outlet ports in a peripheral portion of said rotor for discharge of fluid from said bucket wheels, whereby said bucket wheels are driven by the centrifugal force of the fluid contained in the buckets thereof, and means connecting said bucket wheels in driving relation with said output shaft.

16. In a fluid torque converter the combination of a shaft, a rotor driven by said shaft and having an inlet located centrally thereof and a passageway connecting said inlet to an outlet at the periphery thereof, said rotor having a cavity arranged so that a portion of the wall thereof forms one wall of a section of said passageway, and a wheel mounted in said cavity and having fluid receiving pockets formed in the peripheral portion thereof and being positioned so that the wall of said passage seals said pockets and entraps the fluid in said pockets.

17. In a fluid torque converter the combination of an input shaft, an output shaft, a rotor driven by said input shaft and having an inlet located centrally thereof and a passageway connecting said inlet to an outlet at the periphery thereof, said rotor having a cavity arranged so that a portion of the wall thereof forms one wall of a section of said passageway, a wheel mounted in said cavity and having fluid receiving pockets formed in the peripheral portion thereof and being positioned so that the wall of said passage seals said pockets and entraps the fluid in said pockets, whereby said wheel is driven by the centrifugal force of said entrapped fluid, and means connecting said wheel in driving relation to said output shaft.

18. In a fluid torque converter, the combination of an input shaft, an output shaft, a rotor driven by said input shaft, said rotor having formed therein an inlet at the center thereof, a plurality of cavities spaced radially from said inlet, a plurality of passages connecting said inlet and said cavities, and a plurality of outlet ports for said cavities formed in a peripheral portion of said rotor, a plurality of bucket wheels rotatably mounted in said cavities and being driven by the centrifugal force of the fluid in the buckets of said wheels, means connecting said bucket wheels in driving relation with said output shaft comprising a planetary gear train, said output shaft being connected to the ring gear of said gear train, said input shaft being connected to the sun gear of said gear train, and said bucket wheels being connected to the planet pinion carrier of said gear train, and means adjacent said rotor to receive fluid from said ports and to return the fluid to the inlet of said rotor.

19. A fluid torque converter comprising a rotary driving member, a movable bucket carrier mounted on said driving member and a plurality of fluid-receiving buckets arranged to travel in a closed path having its center radially displaced from the axis of said driving member, means supplying fluid to said buckets at one point in said closed path, means allowing discharge of fluid from said buckets at another point in said closed path, said second named point being a greater radial distance from the axis of said rotary driving member than said first named point whereby said bucket carrier is driven by the centrifugal force exerted on said carrier by the fluid in the buckets between said points and due to rotation of said rotary driving member, an output shaft, and means connecting said movable bucket carrier in driving relation with said output shaft.

20. A fluid torque converter comprising a rotor, a plurality of bucket wheels rotatably mounted on said rotor on axes radially displaced from the axis of said rotor, means supplying fluid to the buckets on said wheels, means allowing discharge of fluid from the buckets of said wheels at points located a greater radial distance from the axis of said rotor than the respective points at which the fluid enters the buckets of said wheels, whereby said bucket wheels are driven by the centrifugal force exerted upon the wheels by the fluid in the buckets thereof and due to rotation of said rotor, an output shaft, and means connecting said bucket wheels in driving relation with said output shaft.

21. In a torque converter, a rotor, a bucket wheel carried by said rotor and mounted for rotation on an axis radially displaced from the axis of said rotor, means creating a force tending to rotate said bucket wheel about the axis thereof when said rotor is rotated, said means comprising means for entrapping a fluid medium in the buckets of said bucket wheel at one point in the path of travel of said buckets and for releasing the fluid from said buckets at another point in said path located at a greater radial distance from the axis of said rotor than said one point.

LEMUEL E. DOUGHERTY.

REFERENCES CITED

The following references are of record in the file of this patent:

UNITED STATES PATENTS

| Number | Name | Date |
| --- | --- | --- |
| 1,551,694 | Reece | Sept. 1, 1925 |
| 1,691,610 | Reece | Nov. 13, 1928 |

FOREIGN PATENTS

| Number | Country | Date |
| --- | --- | --- |
| 437,116 | Great Britain | Oct. 24, 1935 |

Certificate of Correction

Patent No. 2,565,551                                           August 28, 1951

LEMUEL E. DOUGHERTY

It is hereby certified that error appears in the printed specification of the above numbered patent requiring correction as follows:

Column 8, line 53, for claim reference numeral "10" read *5*;

and that the said Letters Patent should be read as corrected above, so that the same may conform to the record of the case in the Patent Office.

Signed and sealed this 25th day of December, A. D. 1951.

[SEAL]

THOMAS F. MURPHY,
*Assistant Commissioner of Patents.*